United States Patent [19]

Landgraf et al.

[11] Patent Number: 5,211,907
[45] Date of Patent: May 18, 1993

[54] ASSEMBLY FOR SECURING A CENTERING PIN WITHIN A BORE OF A NUCLEAR REACTOR CORE PLATE

[75] Inventors: Tilo Landgraf, Erlangen; Rainer Kunz, Nüremberg; Johann Ropers, Erlangen; Martin Zenkel, Röttenbach, all of Fed. Rep. of Germany

[73] Assignee: Siemens Aktiengesellschaft, Munich, Fed. Rep. of Germany

[21] Appl. No.: 788,186

[22] Filed: Nov. 5, 1991

Related U.S. Application Data

[62] Division of Ser. No. 507,254, Apr. 9, 1990, Pat. No. 5,089,215.

[30] Foreign Application Priority Data

Apr. 12, 1989 [EP] European Pat. Off. ........ 89106523.7

[51] Int. Cl.$^5$ .................................................. G21C 5/06
[52] U.S. Cl. ..................................... 376/364; 29/723; 29/243.518; 29/283.5
[58] Field of Search .............. 29/723, 243, 518, 243, 29/517, 243.5, 234, 283.5, 243.521, 243.523, 243.53, 512, 513, 524.1, 906; 376/364, 362, 385, 260

[56] References Cited

U.S. PATENT DOCUMENTS

| | | | |
|---|---|---|---|
| 2,246,888 | 6/1941 | Messenger | 29/524.1 |
| 2,640,618 | 6/1953 | Hale, Jr. | 29/524.1 |
| 2,843,861 | 7/1958 | Gandy | 29/524.1 |
| 2,877,682 | 3/1959 | Barry et al. | 29/524.1 |
| 3,198,058 | 8/1965 | Barry | 29/524.1 |
| 3,345,730 | 10/1967 | Laverty | 29/243.518 |
| 4,182,152 | 1/1980 | Vaill et al. | 29/723 |
| 4,663,119 | 5/1987 | Kerrey | 29/723 |

FOREIGN PATENT DOCUMENTS 856845 12/1960 United Kingdom ................ 29/512

Primary Examiner—P. W. Echols
Assistant Examiner—David P. Bryant
Attorney, Agent, or Firm—Herbert L. Lerner; Laurence A. Greenberg

[57] ABSTRACT

A method and assembly for securing a cylindrical centering pin in a bore formed in a plate includes introducing an end of a centering pin to be secured to a plate into a bore formed in the plate until at least part of a coaxial, radially deformable wall portion of the end to be secured protrudes beyond the plate; and generating pressure in a closed hollow space surrounded by the wall portion with a pressure fluid until the wall portion radially expands and anchors the centering pin. According to another method and assembly, the end is introduced into the bore until at least part of the end to be secured, which has a periphery and an interior with radial slits formed therein, protrudes beyond the plate; and a mandrel-like tool is partially brought into the slits in the interior of the end of the centering pin and radially expands the end of the centering pin with the tool for anchoring the centering pin.

9 Claims, 5 Drawing Sheets

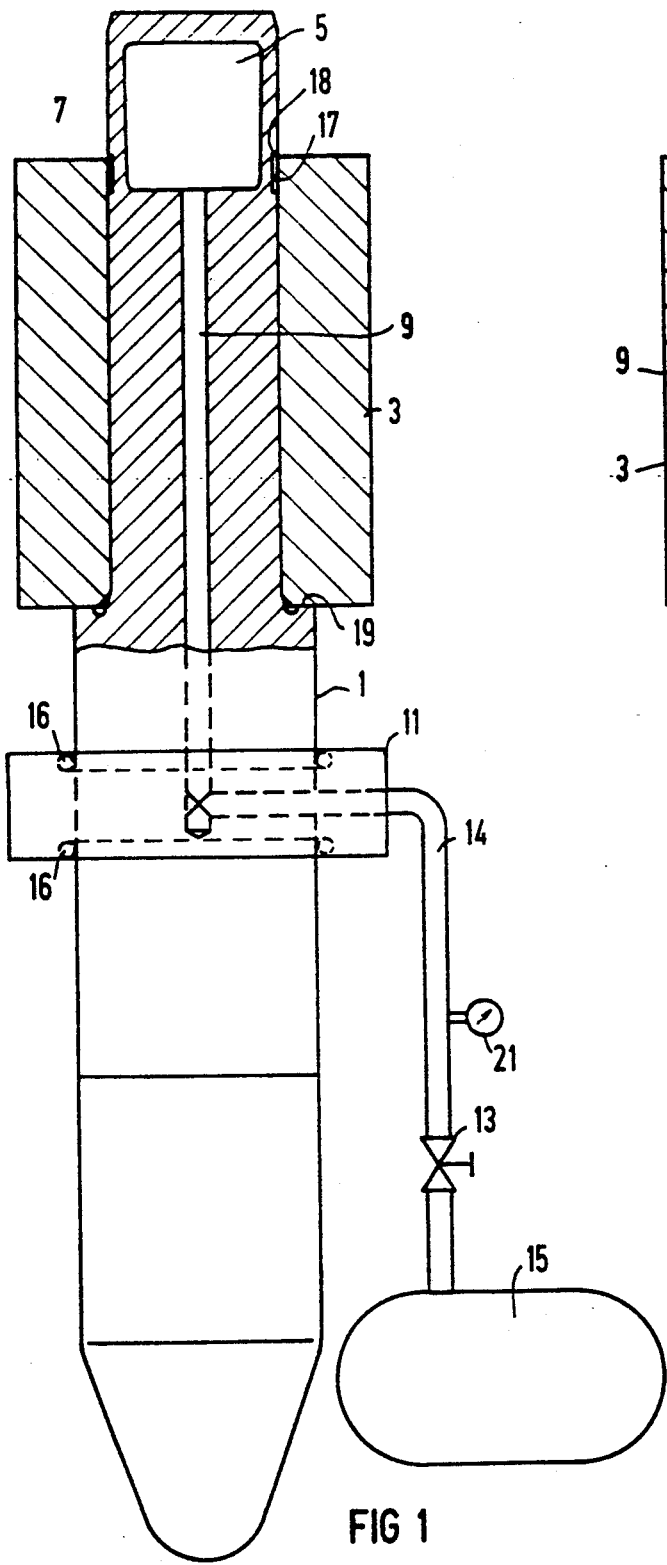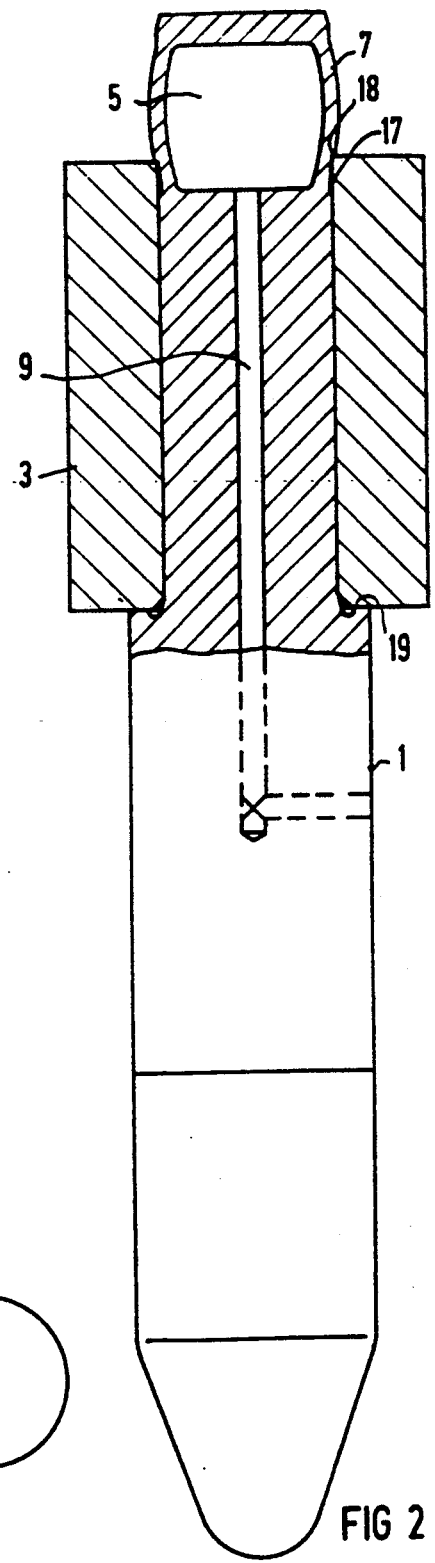

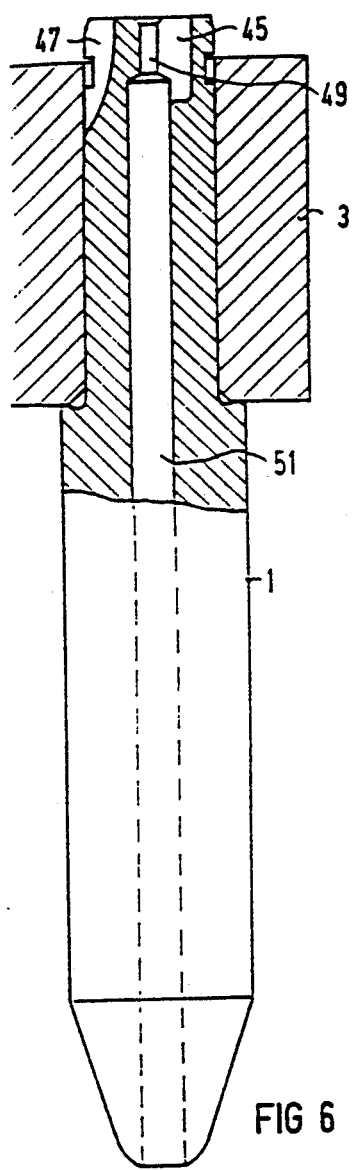
FIG 6
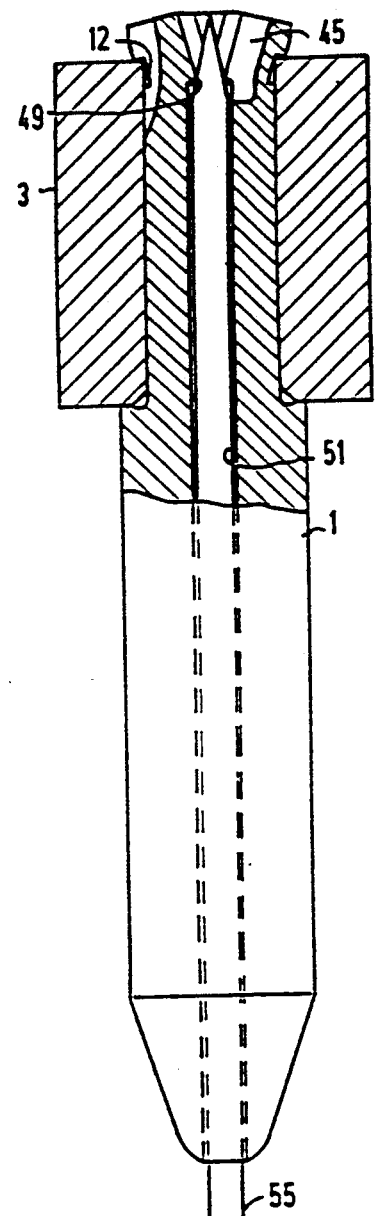
FIG 8
FIG 7
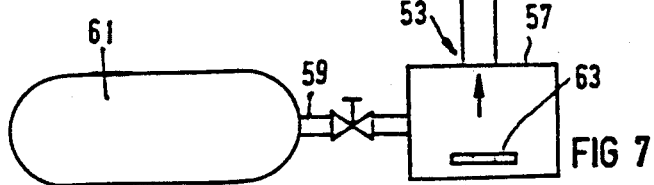

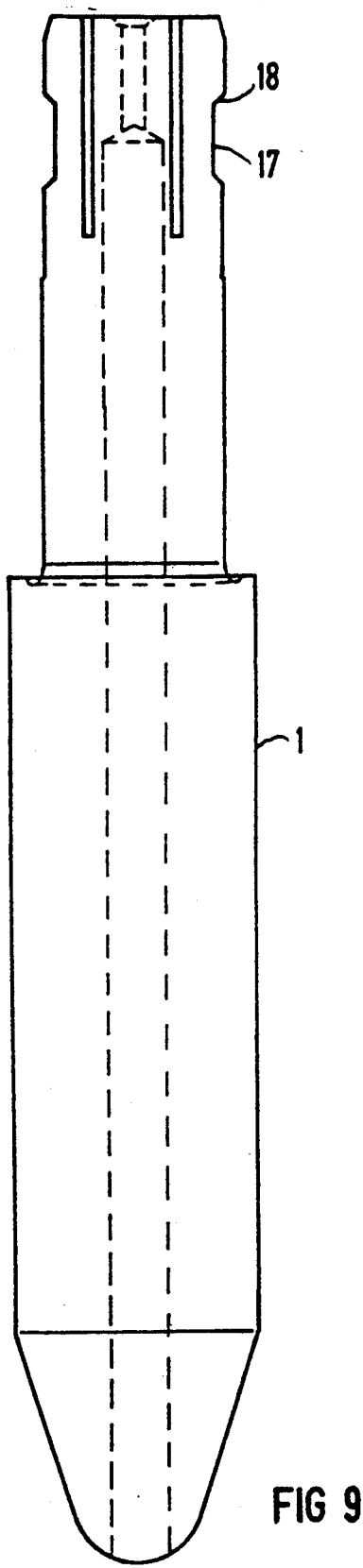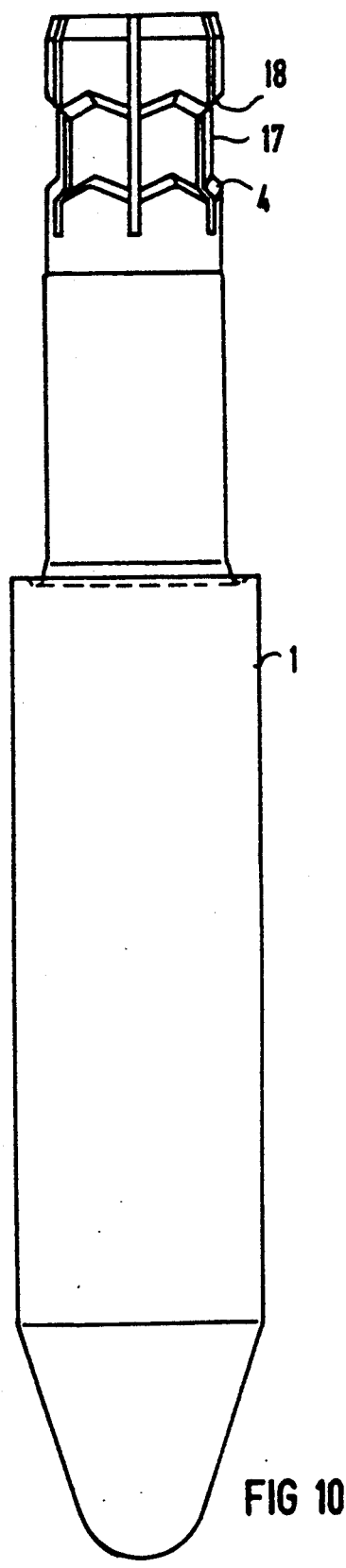
FIG 9
FIG 10

ASSEMBLY FOR SECURING A CENTERING PIN WITHIN A BORE OF A NUCLEAR REACTOR CORE PLATE

This is a division of application Ser. No. 507,254, filed Apr. 9, 1990, now U.S. Pat. No. 5,089,215.

The invention relates to a method and assembly for securing a cylindrical centering pin, which is used in particular for centering fuel assemblies.

In order to secure a centering pin on a plate of a reactor core support structure or framework, such as a grid plate, it is known to use a centering pin having one end that has a collar and is provided with a thread. The centering pin with a thread is passed through the bore of the plate and is screwed firmly against the shoulder by a nut on the back of the plate. In that device, two components must be kept on hand for each centering pin, and when they are installed they must each be joined together from a different side of the plate. Accordingly, the prior art method and assembly requires two components and is quite time consuming to install.

It is accordingly an object of the invention to provide a method and assembly for securing a centering pin, which overcome the hereinafore-mentioned disadvantages of the heretofore-known methods and devices of this general type and with which a one-piece centering device can be anchored in an existing bore more quickly than before. With the foregoing and other objects in view there is provided, in accordance with the invention, a method for securing a cylindrical centering pin, especially for centering fuel assemblies, in a bore formed in a plate, which comprises:

a) introducing an end of a centering pin to be secured to a plate into a bore formed in the plate until at least part of a coaxial, radially deformable wall portion of the end to be secured protrudes beyond the plate; and b) generating pressure in a closed hollow space surrounded by the wall portion with a pressure fluid until the wall portion radially expands and anchors the centering pin.

With the objects of the invention in view, there is also provided a method for securing a cylindrical centering pin, especially for centering fuel assemblies, in a bore formed in a plate, which comprises:

a) introducing an end of a centering pin to be secured to a plate into a bore formed in the plate until at least part of the end to be secured having a periphery and an interior with radial slits formed therein protrudes beyond the plate; and b) bringing a mandrel-like tool partially into the slits in the interior of the end of the centering pin and radially expanding the end of the centering pin with the tool for anchoring the centering pin.

In accordance with another mode of the invention, there is provided a method which comprises introducing the mandrel-like tool into an axial bore formed in the centering pin from a free end of the centering pin for expanding the centering pin. In this way, only one side of the plate need be accessible. This makes the positioning of the centering pin particularly simple.

A common feature of both methods according to the invention is that the assembly time can be considerably reduced, because the centering pin is anchored as a component in a simple manner. This gains particular significance if there is a need to replace the centering pin in a core support structure or framework, because the radiation exposure to operating personnel can be markedly reduced as compared with methods used previously.

With the method using a centering pin having a closed hollow space that can be acted upon by pressure in the end to be secured, it is advantageous if, in accordance with a further mode of the invention, there is provided a method which comprises generating the pressure by igniting an explosive charge with an igniter connected to the charge through electrical lines. This method permits particularly fast anchoring of the centering pin.

In accordance with an added mode of the invention, there is provided a method which comprises generating the pressure by connecting the hollow space through a line to a pressure fluid reservoir. In this way, very precise metering of the pressure can be attained.

With the objects of the invention in view, there is furthermore provided an assembly for securing a cylindrical centering pin in a bore formed in a plate, comprising a cylindrical centering pin having an end to be secured in a bore in a plate, the end having a closed hollow space formed therein defining a coaxial, radially deformable wall portion surrounding the space, and means associated with the hollow space for inflating the end, expanding the wall portion and anchoring the centering pin in the bore. An advantage of this embodiment is that the centering pin is formed in one piece and can be secured to a plate that is accessible from only one side.

In accordance with another feature of the invention, there is provided an outer surface, electrodes disposed on the outer surface, and ignition lines extended through the centering pin to the electrodes, the inflating means including an explosive charge connected to the ignition lines. The anchoring is then accomplished by merely connecting and switching on an igniter.

In accordance with a further feature of the invention, there is provided an adaptor, and a pressure fluid reservoir, especially a hydraulic reservoir, the inflating means including a pressure fluid line having a controllable valve and being connected from the hollow space through the adaptor to the fluid reservoir. This embodiment permits controllable anchoring of the centering pin.

In accordance with an added feature of the invention, there is provided a connecting web extending through the hollow space in the axial direction. With such a configuration, the centering pin preferentially expands in the radial direction, which leads to particularly good anchoring.

In accordance with an additional feature of the invention, the hollow space is an axial blind bore with a bottom being formed in the end to be secured, and the connecting web is a head bolt disposed in the axial blind bore, the head bolt having a head covering the blind bore and being tightly joined to the wall portion, and the head bolt having an end retained in a force-locking manner on the end to be secured at the bottom of the blind bore. This provides a particularly stable version of the centering pin.

With the objects of the invention in view, there is additionally provided an assembly for securing a cylindrical centering pin in a bore formed in a plate, comprising a cylindrical centering pin having an end to be secured in a bore in a plate, the end having a periphery and an interior with radial slits formed therein extending in longitudinal direction of the centering pin, the slits formed in the periphery being offset from the slits formed in the interior, and a mandrel-like tool partly inserted into the slits formed in the interior for expanding the end of the centering pin. This one-piece apparatus is particularly simple to manufacture.

In accordance with again another feature of the invention, the end to be secured has a cylindrical opening formed therein, and the cylindrical opening and the slits formed in the interior together form a star shape with the cylindrical opening at the center or point of the star. This embodiment also enables particularly uniform expansion of the centering pin.

In accordance with again a further feature of the invention, the centering pin has an axial bore formed therein with a restriction in the vicinity of the slits. Such a centering pin can be anchored from the free end thereof by means of the mandrel-like tool, which is introduced into the bore.

In accordance with again an added feature of the invention, the restriction is formed by the cylindrical opening.

In accordance with again an additional feature of the invention, the end to be secured has a radial groove formed thereon forming a shoulder on the plate in the expanded condition of the centering pin. This enables the centering pin to engage the plate from behind in hook-like fashion.

In accordance with yet another feature of the invention, the end to be secured is beveled at least at one side of the groove. Such an embodiment offers highly secure anchoring.

This security can be increased if, in accordance with yet a further feature of the invention, the end to be secured has at least one sawtooth-like side of the groove. Such a centering pin can then be used even if the bore or plate has rough areas. The centering pin digs in behind the bore making the anchoring very reliable.

In accordance with a concomitant feature of the invention, the mandrel-like tool has a rod remaining in the centering pin as a dowel.

Other features which are considered as characteristic for the invention are set forth in the appended claims.

Although the invention is illustrated and described herein as embodied in a method and assembly for securing a centering pin, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 is a diagrammatic, partly broken-away, longitudinal-sectional sectional view of a centering pin introduced into a bore of a plate;

FIG. 2 is a view similar to FIG. 1 showing the centering pin of FIG. 1 in the anchored state;

FIG. 6 is a partly broken-away, longitudinal-sectional view of a further centering pin, taken along the line VI—VI in FIG. 8, in the direction of the arrows;

FIG. 7 is a view similar to FIG. 6 showing the centering pin FIG. 6 in the expanded state, with a tool disposed therein;

FIG. 8 is an end-elevational view of the centering pin of FIG. 6;

FIG. 9 is a side-elevational view of the centering pin; and

FIG. 10 is an elevational view of a centering pin with a toothed groove.

Figure 3:
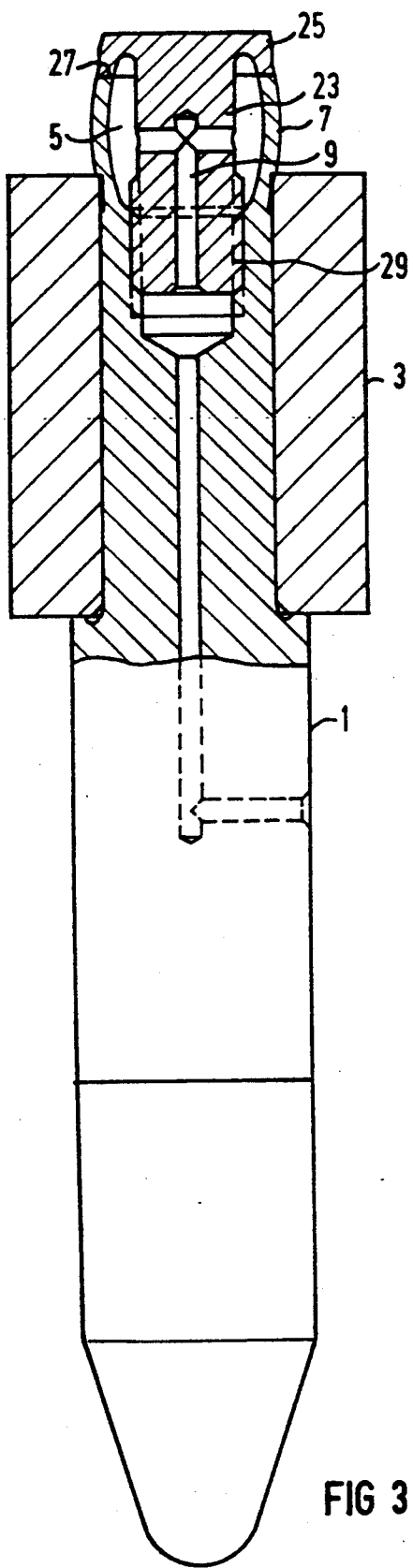
FIG. 3 is a view similar to FIG. 1 of another embodiment of a centering pin.

Referring now to the figures of the drawing in detail and first, particularly, to FIG. 1 thereof, there is seen a centering pin 1 that is introduced into a bore in a plate 3. The centering pin 1 may in particular be a fuel assembly centering pin, which is disposed in the upper core support structure or framework of a pressurized water reactor, on the side of a grid plate oriented toward the fuel assemblies. The side of the grid plate facing away from the fuel assemblies is poorly accessible.

The centering pin 1 has a hollow space 5 formed in one end thereof. The hollow space 5 forms a coaxial wall portion 7 at the end of the centering pin 1. The wall portion 7 is dimensioned in thickness in such a way that it is deformable and can be expanded or enlarged by pressure in the hollow space 5. In order to generate pressure in the hollow space 5, means are provided for inflating the hollow end. In this exemplary embodiment, a pressure fluid line 9 serves this purpose. One end of the line 9 is connected to the hollow space 5 and the other end thereof extends out of the free end of the centering pin 1. The pressure fluid line 9 communicates with a pressure fluid reservoir 15 through an adaptor 11 disposed on the centering pin and a further pressure fluid line 14 provided with a controllable valve 13. The adaptor 11 has an annular interior and at least two O-rings 16 for sealing with respect to the centering pin 1.

One end of the periphery of the centering pin 1 has a radial groove 17 formed therein, which is located on the centering pin 1 in such a way that in the expanded condition of the centering pin 1, one edge of the pin at a side 18 of the groove 17 forms a shoulder on the rear edge of the plate 3.

In order to secure the centering pin 1 in the plate, the following procedure is used: The centering pin is introduced by the end to be secured into the bore in plate 3, so that at least part of the deformable wall portion 7 protrudes beyond the plate 3. For this purpose, it is advantageous for the free end of the centering pin 1 to have a larger diameter than the part of the centering pin 1 located in the bore. This forms a shoulder 19, which serves as a stop for the insertion depth of the centering pin 1.

The introduced centering pin 1 is then provided with the adaptor 11, so that the hollow space 5 can be made to communicate with the pressure fluid reservoir 15. Opening the controllable valve 13 then generates a pressure in the closed hollow space 5 of such magnitude that the coaxial wall portion 7 expands and the centering pin 1 is anchored as a result. Water is preferably provided as the pressure fluid. Other suitable pressure fluids can also be used. In order to monitor the degree of expansion, it may be suitable to connect a pressure gauge 21 to the line 9.

Once the wall portion 7 has been expanded sufficiently, the delivery of pressure fluid through the valve 13 can be interrupted, and the adaptor 11 can be removed from the centering pin 1.

An anchored centering pin 1 in which the wall portion 7 is radially expanded, is shown in FIG. 2. In this case, one side 18 of the groove 17 comes to a stop at the rear edge of the plate 3, thereby forming a collar. As a result, the centering pin 1 is caught in place in a quasi-hook-like fashion.

With this method, the rear edge of the plate 3 need not be accessible. All work can be carried out from the front. Moreover, the anchoring can be performed very quickly, because it merely requires effecting the connection with the pressure fluid reservoir 15. Furthermore, removal of the centering pin 1 from the bore in the plate is extremely simple. The wall portion 7 is dimensioned in such a way that if a tensile force is exerted on the centering pin 1 in the direction of the free end, the wall portion deflates again. This provides for easy replacement of the centering pin 1.

FIG. 3 shows another possible version of the centering pin 1. In this case a connecting web 23 extends axially through the hollow space 5. The web connects the two end surfaces of the hollow space 5 with one another. The use of this embodiment means that pressure in the hollow space 5 essentially causes radial expansion of the wall portion 7. On one hand, the wall surfaces at the hollow space 5 are reduced in size in the axial direction, and on the other hand these surfaces are held together by the connecting web 23. This structure can be manufactured particularly simply if the hollow space 5 and the connecting web 23 are provided by forming an axial blind bore in the centering pin 1 and placing a head bolt 25 therein. The head of the head bolt 25 covers the blind bore and is tightly joined to the wall portion at the blind bore. This is accomplished, for instance, by means of a weld seam 27. Other fastening options are also possible, such as soldering. The other end of the head bolt 25 is retained on the bottom of the blind bore by force-locking. A forcelocking connection is one which connects to elements together by force external to the elements, as opposed to a formlocking connection which is provided by the shapes of the elements themselves. This connection is suitably in the form of a thread 29. The pressure fluid line 9 is extended through the connecting web 23. This version of the centering pin 1 allows a particularly high pressure to be imposed.

Figure 4:
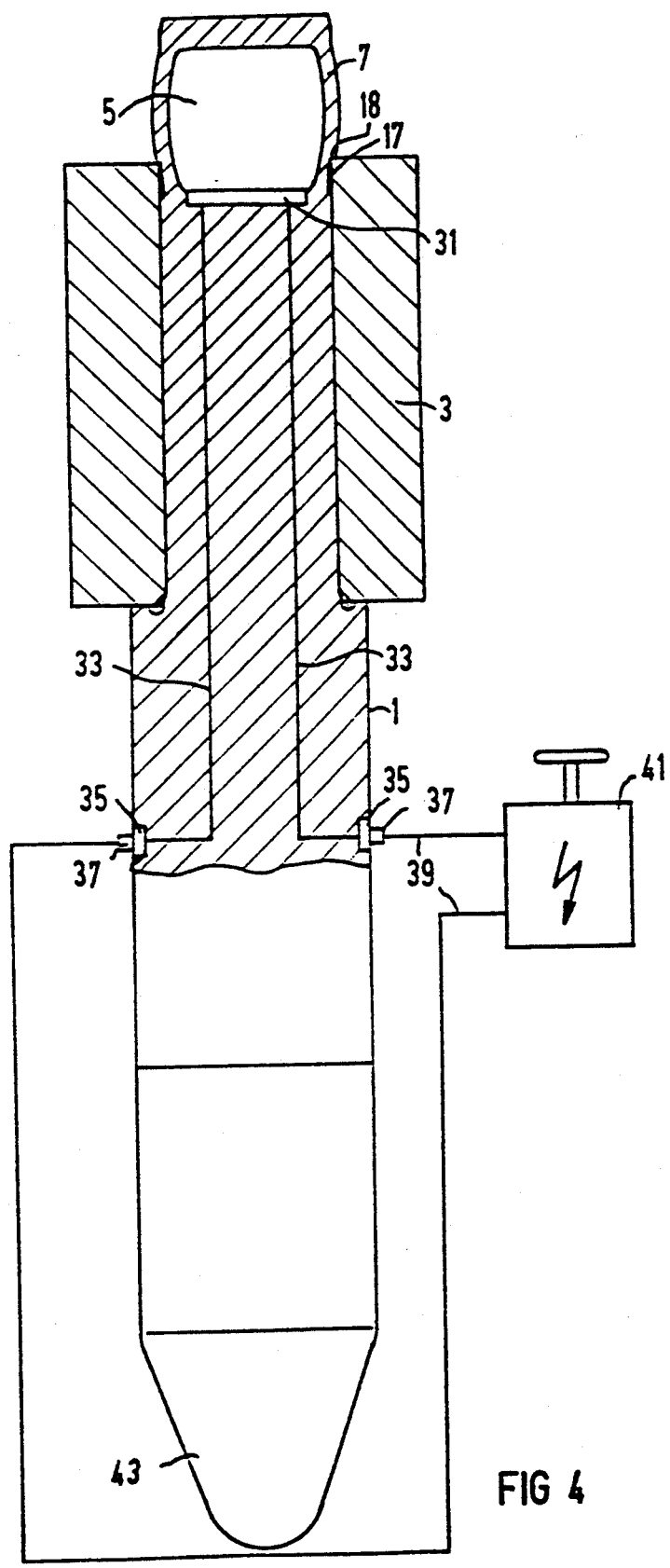
FIG. 4 is another view similar to FIG. 1 of a centering pin with an explosive charge, in the anchored state.

FIG. 4 shows an exemplary embodiment of a centering pin 1 that has already been anchored in a bore of the plate 3. An explosive charge 31 to which ignition lines 33 are connected, serves as the means for inflating the hollow end. The ignition lines are extended through the centering pin 1 to electrodes 35 disposed on the outer surface of the centering pin 1. Contacts 37 that are connected through electrical lines 39 to an actuatable igniter 41, are guided to these electrodes 35. The external shape of the centering pin 1 is equivalent to that described with regard to FIG. 1. The centering pin 1 has a tapered tip 43 on the free end thereof, which simplifies the later introduction of the centering pin 1 into the fuel assemblies. Furthermore, one side 18 at the groove 17 is beveled. This provides better tool access from behind in the expanded condition of the centering pin 1.

In order to secure the centering pin, the procedure is as follows: The centering pin 1 is first introduced into the bore in the plate 3, as already described above. Once the contacts 37 have been connected to the electrodes 35, the explosive charge 31 is ignited by means of the igniter 41. The centering pin 1 is therefore abruptly anchored.

Figure 5:
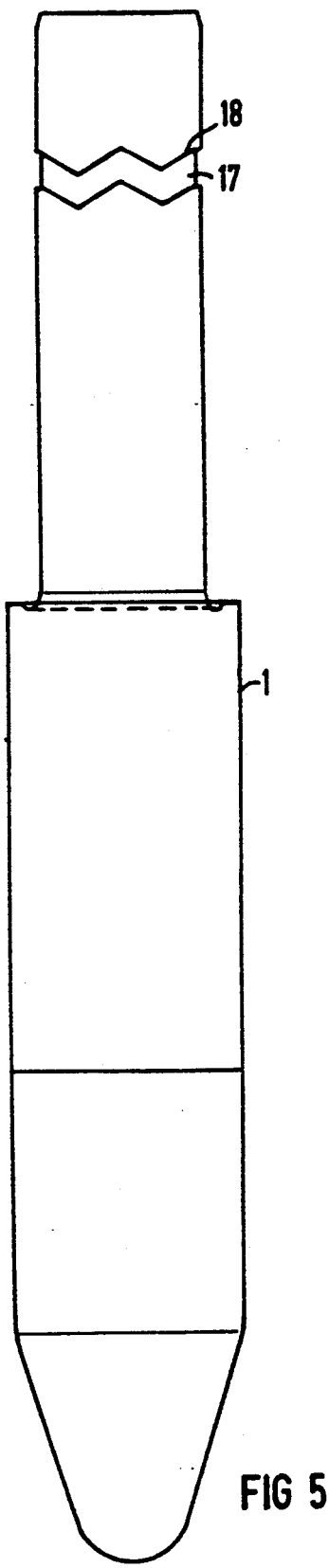
FIG. 5 is an elevational view of a centering pin.

FIG. 5 shows another embodiment of a centering pin 1 as seen from the outside. The centering pin has at least one sawtooth-like side 18 at the groove 17. This is practical if the centering pin 1 is introduced into a bore that may possibly have roughness on its edge. Digging in and barb-like engagement of the sawtooth side 18 with the edge of the bore takes place and provides particularly good securing of the centering pin 1, as a result of the fact that the centering pin 1 is made of deformable material. This also produces a firm seating of the centering pin 1, in the event that there is slightly too much play between the centering pin 1 and the bore in the plate 3.

FIG. 6 shows another exemplary embodiment of the centering pin 1. In order to anchor the centering pin 1 in the bore of the plate 3, the end of the centering pin 1 to be secured is provided with radial slits 45, 47 on the periphery and in the interior thereof, which extend longitudinally of the centering pin 1. The inner slits 45 are offset from the outer slits 47, and the inner slits 45 provide access for a mandrel-like tool for expanding the end. This is made possible, for instance, by a star-shaped configuration of the inner slits 45.

The disposition of the slits 45, 47 can be seen from FIG. 8 which shows an end view of the end to be secured. Preferably, four of each of the slits 45, 47 are provided. However, some other number is also possible. In order to provide the access for the mandrel-like tool, the inner slits 45 should be disposed in a star shape. The star point may be in the form of a cylindrical opening 49. The expansion of the end produces a fan-wise spreading in the vicinity of the slits 45, 47.

In FIG. 6, both the slits 45, 47 and the cylindrical opening 49 can be seen in longitudinal section. In this case, the centering pin 1 has an axial bore 51, which communicates with the cylindrical opening 49. The cylindrical opening 49 forms a restriction as seen in axial direction from the axial bore 51. The end of the centering pin 1 to be expanded is also accessible from the free end through the axial bore 51. Accordingly, the centering pin 1 can be selectively anchored from both ends.

In FIG. 7, the centering pin of FIG. 6 can be seen with one end expanded by means of a tool 53. The tool 53 is substantially formed of a mandrel-like rod 55 and drive means 57 associated with the rod 55 for axially advancing it. The drive means are connected through a line 59 to a pressure fluid reservoir 61. Actuating portions 63 are provided on the drive means 57.

In order to anchor this centering pin 1, the procedure is as follows: First, as already described above, the centering pin 1 is introduced into the bore of the plate 3, so that at least part of the end provided with slits protrudes past the plate 3. The mandrel-like tool 53 is brought to bear at the inner slits 45 in order to expand the end of the centering pin 1. This is carried out by introducing the rod 55 of the tool 53 into the axial bore 51 of the centering pin 1 from the free end. By actuating the drive means 57, the sharpened end of the rod 55 is forced into the restriction formed by the opening 49. Through the use of this process, the slit end of the centering pin 1 is expanded, and as a result the centering pin 1 is anchored. After the expansion, the rod 55 of the tool 53 is withdrawn from the axial bore 51 again. In this embodiment, the radial groove 17 again forms a collar for engaging the plate 3 from behind.

The rod 55 of the mandrel-like tool 53 can also be used as a dowel, which remains in the centering pin 1 after the expansion and is secured against falling out.

FIG. 9 shows this version of the centering pin 1 as seen from the outside. It is provided with the groove 17 with at least one beveled side 18 in the end to be anchored.

FIG. 10 shows a further exemplary embodiment of the centering pin 1, in which the groove 17 is provided with sawtooth-like sides. This embodiment enables particularly good securing of the centering pin 1 in a bore, as already described in conjunction with FIG. 5.

A common feature of all of the above-described methods and devices is that the assembly time for the use thereof can be reduced considerably as compared with conventional methods, because the centering pin 1 is anchored as a component, in particular as a one-piece component, in a simple manner. This is particularly important if the centering pin has to be changed in radiation zones, because the exposure to operating personnel can be markedly reduced by the novel structure and the method of installing the same.

We claim:

1. In a nuclear reactor, a combination of a reactor core plate and an assembly for securing a cylindrical centering pin of a fuel assembly in a bore formed in the reactor core plate, said assembly comprising a cylindrical centering pin having an end to be secured in a bore in the core plate, said end having a periphery with radial slits formed therein and an interior with radial slits formed therein, said slits extending in the longitudinal direction of said centering pin, said slits formed in said periphery being offset from said slits formed in said interior, and means in the form of a mandrel-like tool partly inserted into said slits formed in said interior for radially expanding said end of said centering pin.

2. Apparatus according to claim 1, wherein said centering pin has an axial bore formed therein with a restriction in the vicinity of said slits.

3. Apparatus according to claim 1, wherein said end to be secured has a radial groove formed about the periphery thereof forming a shoulder resting on the plate in the expanded condition of said centering pin.

4. Apparatus according to claim 3, wherein said groove is beveled at least at one side thereof.

5. Apparatus according to claim 3, wherein said groove has at least one sawtoothed side.

6. Apparatus according to claim 1, wherein a part of said mandrel-like tool remains in said centering pin as a dowel after said end has been expanded and said cylindrical centering pin is secured in the bore of the plate.

7. In a nuclear reactor, an assembly for securing a cylindrical centering pin of a nuclear fuel assembly in a bore formed in a reactor core plate, comprising a cylindrical centering pin of a fuel assembly having an end to be secured in the bore in the reactor core plate, said end having a radially expandable wall portion, said centering pin being movable in the bore until at least part of said expandable wall portion protrudes beyond the plate and means associated with said expandable wall portion for expanding said wall portion and anchoring the centering pin the bore.

8. Assembly according to claim 7, wherein the bore has a length and said radially expandable wall portion comprises a first part protruding beyond the plate and a second part remaining in said bore, said second part having a length substantially smaller than the length of the bore.

9. Assembly according to claim 7, wherein said end comprising said expandable wall portion has a periphery with radial slits formed therein and an interior with radial slits formed therein, said slits extending in a longitudinal direction of the centering pin, said slits formed in said periphery being offset from said slits formed in said interior, and means in the form of a mandrel-like tool partly inserted into said slits formed in said interior for expanding said end of said centering pin.

* * * * *